May 4, 1937. W. W. HOKE Re. 20,349

TREATMENT OF METALS BY ELECTROMAGNETIC FORCES

Original Filed Nov. 7, 1933 3 Sheets-Sheet 1

INVENTOR
Walter W. Hoke
BY
Williams Richmond
ATTORNEYS

May 4, 1937. W. W. HOKE Re. 20,349

TREATMENT OF METALS BY ELECTROMAGNETIC FORCES

Original Filed Nov. 7, 1933 3 Sheets-Sheet 2

INVENTOR
Walter W. Hoke
BY
Williams Richardson
ATTORNEYS

TREATMENT OF METALS BY ELECTROMAGNETIC FORCES

Original Filed Nov. 7, 1933 3 Sheets-Sheet 3

INVENTOR
Walter W. Hoke
BY
Williams, Rick & Morse
ATTORNEYS

Reissued May 4, 1937

Re. 20,349

UNITED STATES PATENT OFFICE 20,349

TREATMENT OF METALS BY ELECTRO-MAGNETIC FORCES

Walter W. Hoke, Forest Hills, N. Y., assignor to Westcott Electric Casting Corporation, New York, N. Y., a corporation of New York Original No. 2,013,653, dated September 10, 1935, Serial No. 696,940, November 7, 1933. Application for reissue July 30, 1936, Serial No. 93,429

32 Claims. (Cl. 75—93)

Figure 1:
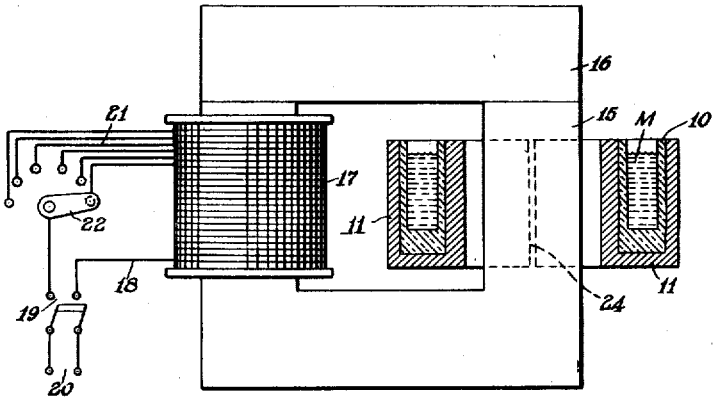

The present invention relates to a novel method of treating metals by electromagnetic forces. More specifically stated, the invention contemplates improving the internal structure of metal bodies by the use of such forces, which are appropriately introduced therein for that purpose. The term "metal" as used herein is intended to refer to both single elements and mixtures of elements.

The relative pressure (the absolute pressure minus atmospheric pressure) at a point in a liquid at rest is proportional to the specific gravity of the liquid and to the vertical distance between the point and the upper surface of the liquid. The pressure, relative or absolute, is constant at all points of equal depth, but increases with increasing depth in the liquid. A force is therefore created on a body immersed in the liquid, equal to the net difference between the vertical pressure components acting upwards on the body and those acting downwards thereon. This force acts upward to the extent of the weight of the liquid displaced by the body and is termed the buoyant effort of the liquid on the body. Now such common impurities in metal as gas pockets and occluded oxide particles are less in specific gravity than the metal bodies which enclose them. Therefore, the buoyant effort of a molten mass of metal on such an impurity is greater than the weight of the impurity; and, if the metal does not undergo solidification and no conditions causing occlusion of the impurity are present, the impurity rises and in time reaches the upper free surface of the metal, either floating there if it is a solid or escaping to the atmosphere if it is a gas. When the impurity is at rest in the metal, it is acted upon only by its weight and the buoyant effort of the metal. When set in motion, however, the impurity is also subjected to a frictional force, which is due to the viscosity of the molten metal and acts in opposition to the motion of the impurity. It should be observed that all liquid bodies possess more or less viscosity. The resistance encountered by the impurity in its travel from the interior of the metal is therefore created regardless of the particular nature of the metal and temperature to which it may be raised above its melting point. The greater the viscosity of the molten metal the longer the time it will take for the impurity to reach the upper surface. The buoyant effort, because of its constant action at all depths, tends to accelerate the motion of the impurity, whereas the resistant force of viscosity, because of its increasing action with increase of velocity, tends to decelerate the motion of the impurity.

It is a fact, therefore, that the physical factors which govern the tendency of a molten mass of metal to free itself of impurities, are its buoyancy and its fluidity. The more pronounced these factors are, the greater is the extent to which its internal structure is bettered. Nevertheless, complete elimination of impurities as a result of natural buoyancy and natural fluidity, sole factors depended upon for such elimination, is in general difficult; and, regardless of the precautions taken or casting procedures employed, gas pockets and occluded oxide particles are often formed to an extent more than it is deemed desirable. Thus, when molten metal is poured into a mold, expulsion of moisture from the material of the mold invariably takes place, as a result of which gas pockets are formed in the solidifying metal. Principally hydrogen is entangled in this manner, most of the oxygen of the vapor being taken up by the metal to form a film of oxide surrounding the gas. Blowholes or gas pockets are also caused by the carrying of air along with the metal into the mold. The gas thus drawn into the metal bath consists principally of air and whatever moisture it contains. While it may all escape as long as the metal remains sufficiently fluid, it is largely entrapped in the solidifying metal. Still another reason for the presence of blowholes in metals resides in their pronounced tendency of dissolving gases from the contacting atmosphere while in the molten state, with the result that, when approaching solidification, considerable quantities of gas are suddenly evolved. In the case of aluminum, for example, this phenomenon is quite noticeable. The gases being set free close to the point of solidification, a considerable portion is entrapped in the form of gas pockets. Such defects as occluded oxide particles may be caused by the drawing of slag into the metal bath during the pouring operation. With many metals the absorption or solution of oxide affects their fluidity considerably. Even minute quantities of oxide of foreign matter in certain cases may cause the metal bath to become pasty, so that escape of either gas or solid impurities is made increasingly difficult. There are, of course, other causes for impurities. In the case of iron, for example, pockets of carbonic acid gas may be formed as a result of reduction of oxide of iron by the carbon present. Whatever may be the factors causing formation of impurities, the latter are nevertheless permitted to form because of insufficient buoyancy and fluidity of molten metal.

In accordance with the invention, the metal to undergo treatment is subjected, while in the molten state, to the action of electromagnetic forces unidirectionally or substantially unidirectionally introduced therein. As will be hereinafter more particularly described, these forces, because of their internal character, create an artificial pressure gradient in the metal, which, because of the resulting pressure differences acting on interior impurities, effects a forced separation of the latter in a direction opposite to that in which the forces are applied. Only non-conductive or comparatively non-conductive impurities are acted upon by this pressure gradient, but most common impurities in metal are non-conductive or comparatively non-conductive, from which it follows that impurity elimination to a considerable extent will occur in the metal body treated, if the forces employed are of sufficient intensity to effect the proper pressure differentials therein. Moreover, when the forces are cyclic, i. e., so produced as to cause them to vary periodically with time, they then also function, in view of their parallelism, to so agitate the metal internally that travel of impurities from its interior is greatly facilitated, the opposing forces of viscosity being apparently considerably reduced by the parallel or substantially parallel displacements of the metal elements. If the fluidity of the molten metal is not actually increased as a result of this agitation, at least an effect similar to a pronounced increase thereof is produced. Hereinafter, the effect produced by the agitation of the present invention will be referred to for convenience as an actual increase of fluidity.

From the foregoing discussion it is seen that the treatment effected in molten metal according to the invention depends upon operating factors identical in principle to those which govern the natural tendency of the metal to free itself of impurities. The preferred manner of practicing the invention is to cause the treatment to supplement or assist this natural tendency. That is, forces of both cyclic character and downward direction are preferable utilized, as then both an effect of increased fluidity of the molten metal and an actual increase in its buoyancy are obtained. Besides, when the cyclic forces are caused to act downward, the agitation is then, it is believed, most effective in increasing the fluidity of the molten metal. On the other hand, the invention is not limited to the use of downward forces, but provides the distinct advantage that impurities may be separated in any direction desired by the use of forces appropriately directed in the metal. The separating action of the treatment on impurities may be strengthened or adjusted to the extent required, it being possible to force out impurities having either higher or lower specific gravity values than that of the metal.

Another important effect of the treatment is the temperature gradient which is established in the metal, when cyclic forces are introduced therein. That is, the production of cyclic forces in metal in accordance with this invention is invariably accompanied by a pronounced increase of temperature in a direction opposite to that in which the forces are applied. The advantage of this temperature gradient resides in the fact that, when treatment is continued during the cooling stage, solidification takes place progressively in the same direction in which impurities are separated. As a result, the gases which are suddenly evolved near solidification cannot remain in the metal, but escape freely through that portion of the metal which has not yet solidified. Stated in other words, such gases are forced out rapidly by the treatment as soon as they take form at each solidifying layer.

In the production of a casting, the treatment of the metal may be carried out in the mold in which it is cast, and should be continued until the metal has cooled into the solid state. The metal is preferably treated while it is filling the mold during the pouring operation; and, if desired, the treatment may even be continued beyond the stage of solidification. By this procedure, maximum freedom from impurities is obtained, and defects due to uneven cooling are also eliminated, as will be hereinafter more clearly understood.

I may utilize either one of two methods or a combination of the two for electromagnetically inducing unidirectional forces in the metal to undergo treatment. One method, in accordance with which the forces hereinafter represented by $f_1$ are produced, consists in subjecting the metal, through which a current is passed, to the action of a magnetic field other than that produced by the current. The second, in accordance with which the forces hereinafter represented by $f_2$ are produced, consists in subjecting the metal, through which a current is passed, to the action of a magnetic body or magnetic bodies placed in its vicinity and partially enclosing it so as to modify the field produced by the current to advantage. That is, the effect of field on current is utilized in this second method as in the first, the essential difference between the two methods being that in the first the field is one produced independently of the current passed through the metal and in the second it is the particular field produced by that current, but modified in both direction and intensity by the action of the magnetic body or bodies. The second is preferred in view of its simplicity. Thus the treatment may be carried out simply by disposing the current-carrying metal within magnetic walls partially enclosing it at least on two opposite sides. Now in carrying out the first method, the use of a magnetic body or magnetic bodies is also necessitated for properly strengthening and directing the field required for the production of its unidirectional forces $f_1$. It therefore follows that unidirectional forces $f_1$ and $f_2$ may be simultaneously produced in the metal to undergo treatment by causing the magnetic body or bodies, which are required by the two methods, to conduct and properly direct both the field produced otherwise than by the current passed through the metal and the field produced by said current. More briefly stated, the two methods may be combined by employing the same magnetic body or bodies for producing both forces $f_1$ and forces $f_2$ in the metal.

It is to be particularly noted that the field produced by the current passed through the metal normally produces forces which are variously directed, and the treatment of the metal in accordance with this invention demands that these normal forces be eliminated or substantially eliminated, either by altering their character or by neutralizing their action in the metal. In carrying out the second method, they are eliminated in the sense that their character is altered. In other words, the field produced by the current passed through the metal is modified to advantage by the magnetic body or bodies employed, with corresponding production of unidirectional forces $f_2$ in the metal. When the first method is employed, however, this field may or may not be modified to advantage by the magnetic body or bodies. If not, then it is essential that it be neutralized by the superior strength of the field required for producing the unidirectional forces $f_1$. Here the normal forces are eliminated in the sense that their action in the metal is neutralized. This may be understood by observing that the actual forces present in the metal in any case are produced by the resultant field therein. Thus, when the field produced by the current passed through the metal is not modified to advantage, the only forces electromagnetically produced in the metal if this field is neutralized, coincide or substantially coincide in direction with the forces $f_1$. For convenience in description the production of the forces by the field produced otherwise than by the current passed through the metal is herein treated independently of the production of the forces by the field produced by said current. That is, the first method is treated in a manner presupposing the existence of both fields, this being permissible in view of the fact that the actual forces present in the metal may also be considered as the resultants of the respective forces produced by the two fields.

Generally stated, the electromagneitc forces of required unidirectional action are produced in the metal to undergo treatment by passing an electric current through said metal and subjecting it to the action of a magnetic field uniformly directed therethrough transversely to the path of said current. That is, regardless of the particular method employed, it is necessary that a current be passed through the metal, and that parallel or substantially parallel lines of flux be established in each consecutive plane transverse to the path of said current. Either direct or alternating current may be used. If direct current is used, a non-alternating field is required. If alternating current is used, an alternating field of the same frequency and of the proper phase relation is required. The forces produced with direct current are obviously steady forces. On the other hand, the forces produced with alternating current are cyclic forces varying with time at a frequency twice that of the current, but having definite effective values acting in a definite direction in the mass under treatment. As will be hereinafter more clearly understood, either steady or cyclic forces may be used to create the internal pressure differences necessary to effect forced separation of impurities. The invention, however, favors the use of alternating current, because of the additional effects created, namely, the increased fluidity of the metal and the temperature gradient established therein. The use of alternating current is also desirable from a practical standpoint, when treating large masses of metal.

When referring to the electromagnetic forces employed for the treatment according to the invention as unidirectional, it should be understood that such forces are caused to act unidirectionally with respect to the path of the current in the metal, i. e., that unidirectional forces are produced in each consecutive plane transverse to said path. It should be further observed that, as the later description will show, the cyclic forces resulting from the use of alternating current, except under certain conditions at isolated points of the mass under treatment, are truly alternating forces, reversing in direction when passing through zero points of their waves. In other words, the cyclic forces electromagnetically induced in metal in accordance with this invention generally act, regardless of the particular method employed for their production, through recurrent portions of their waves in a direction opposite to that in which they preponderantly act through the remaining portions. For convenience in description, they are nevertheless at times referred to or inferentially identifiable herein as unidirectional forces, implying, even when their particular direction is specified, as when referring to them as downward forces, that their effective values act unidirectionally in the mass under treatment.

The present invention aims to create perfect conditions in treating metal bodies with the view to improving their internal structure, and practical methods to this end will be described with the aid of the accompanying drawings, which illustrate the invention, chiefly diagrammatically, as applied to the art of casting metal ingots.

Figure 2:
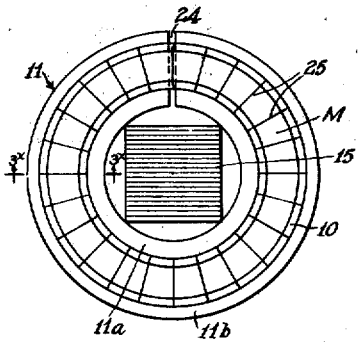
Figure 3:
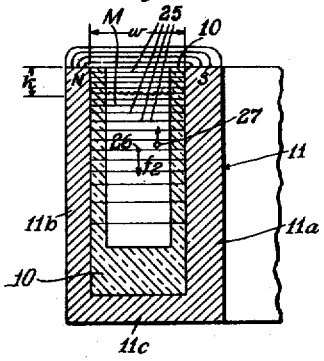
Figure 4:
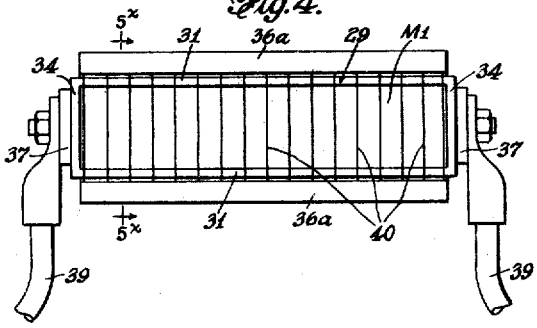
Figure 5:
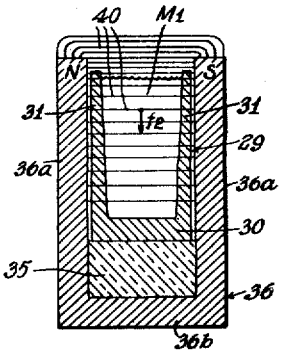
Figure 6:
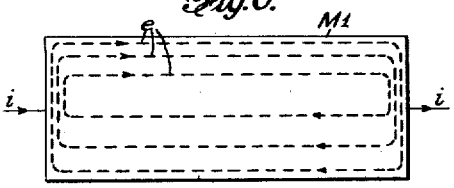
Figure 7:
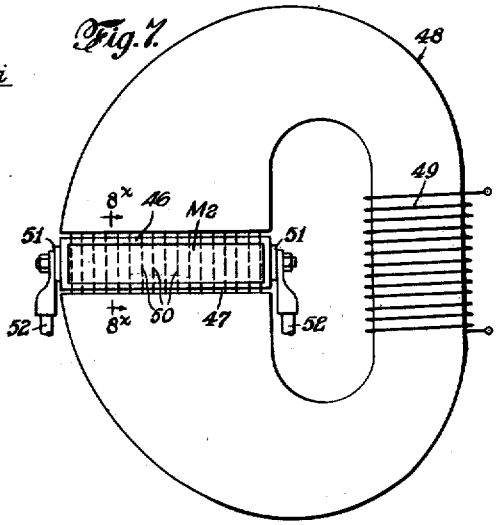
Figure 9:
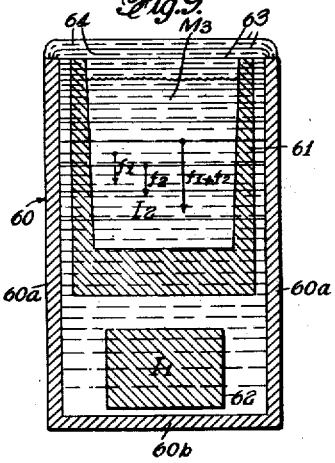
Figure 8:
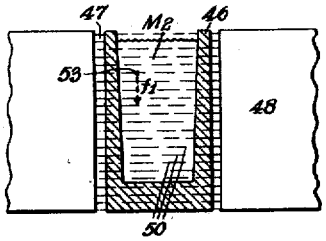
Figure 10:
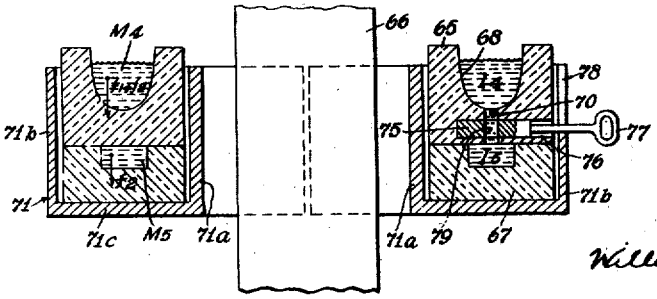
Figure 11:
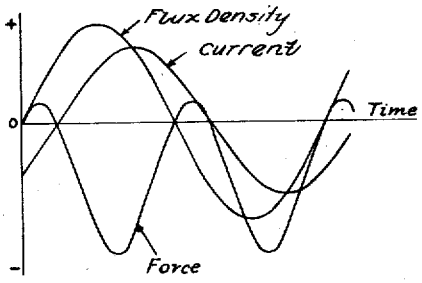
Figure 12:
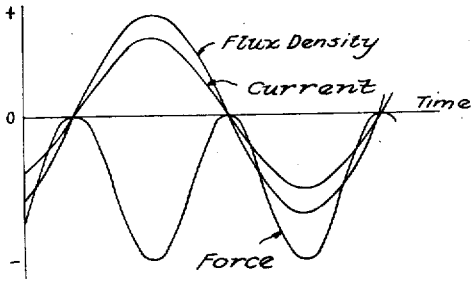
Figure 13:
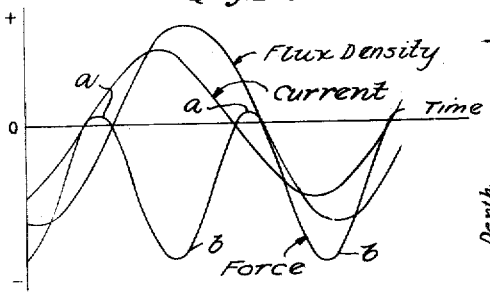
Figure 16:
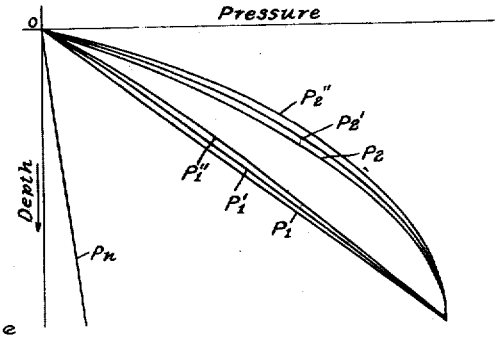
Figure 17:
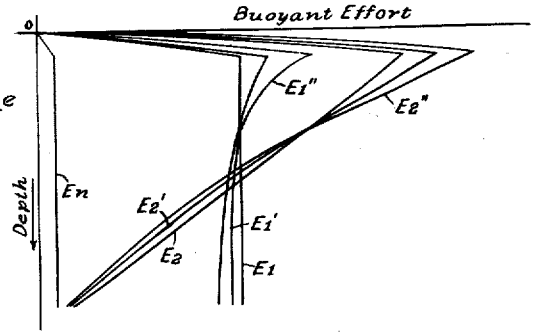
Figure 14:
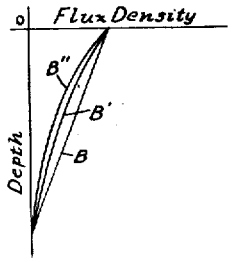
Figure 15:
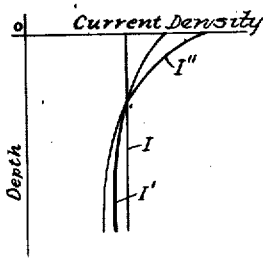

In the drawings, Fig. 1 is a view in elevation, partly in section, of an apparatus for the production of ingots in ring form, also showing the circuit of the transformer primary; Fig. 2 is a top plan view of important elements of the apparatus shown in Fig. 1, with the upper transformer core part removed; Fig. 3 is an enlarged fragmental sectional view on the plane indicated by the line and arrows 3×—3× in Fig. 2, particularly illustrating the flux produced between the side walls of the magnetic channel and its effect of introducing forces $f_2$ in the metal; Fig. 4 is a top plan view of an apparatus for the production of rectilinear forms; Fig. 5 is an enlarged fragmental sectional view on the plane indicated by the line and arrows 5×—5× in Fig. 4, particularly illustrating the flux produced between the side walls of the magnetic channel and its effect of introducing forces $f_2$ in the metal; Fig. 6 is a side elevation of the metal body treated in the apparatus of Figs. 4 and 5, particularly illustrating the eddy current path therein; Fig. 7 is a top plan view of another apparatus which may be utilized in casting rectilinear forms; Fig. 8 is an enlarged fragmental sectional view on the plane indicated by the line and arrows 8×—8× in Fig. 7, particularly illustrating the flux produced in the metal by the electro-magnet and its effect of introducing forces $f_1$ in the metal; Fig. 9 is a cross-sectional view of an apparatus by which metal may be treated by both forces $f_1$ and $f_2$, particularly illustrating the fluxes produced by the two currents and their effect of introducing said forces in the metal; Fig. 10 is a sectional elevation of an apparatus by means of which metal may be both treated and cast by electromagnetic forces, treatment taking place therein both before and after its introduction into the mold; Figs. 11 to 13 inclusive are illustrations of flux density and current waves having various phase relations and of the waves of force correspondingly produced; Figs. 14 and 15 are curves showing, respectively, flux density and current density relations with metal depth; and Figs. 16 and 17 are curves showing, respectively, pressure and buoyant effort relations with metal depth.

The drawings illustrate the invention as adapted to the pouring of molten metal into horizontal molds wherein it is treated by downward forces, an electric current being caused to pass through the poured metal by electromagnetic induction or by connecting the ends of the molds through conductors to a suitable source of power.

Figs. 1 to 3 inclusive illustrate a mold 10, of sand or other refractory, having an annular space shown containing a mass of metal M, which may have been poured by gravity therein. This mold is positioned or formed within an annular channel 11, whose side walls 11a and 11b thus provide a gap wherein the metal M is treated. In the embodiment illustrated, the side walls 11a and 11b are positioned upright, the intermediate wall 11c being located below the mold. These walls are all made of magnetic material, such as iron, and, together with the mold 10, surround one leg of the lower part 15 of a transformer core, the upper part 16 of which is removable. On the other leg is fitted a transformer primary 17, the end terminal 18 of which may be connected through one side of a double-pole switch 19 to one terminal of a suitable source of alternating current 20. This primary is provided with a suitable number of taps 21, any one of which may be connected by means of a tap-switch 22 through the other side of the switch 19 to the other terminal of the source 20. In this way, when the switch 19 is closed, an alternating current is induced by transformer action in the metal M acting as a closed single-turn secondary, and this current may be adjusted to the required value or caused to vary by means of the tap-switch 22. The magnetic walls 11 are formed with a radial slot 24 to prevent them from acting as a closed secondary. They should be so designed, i. e., of such a reluctance (permeability and thickness) and of such a width of gap $w$, that the flux 25 produced by the current flowing in the metal is caused to be directed in a manner such as is illustrated and as will be presently described, the inner wall 11a for this reason being preferably made thicker than the outer wall 11b. Obviously, the flux 25 is an alternating flux.

The effect of the magnetic walls 11 on the lines of induction established by the current flowing in the mass M is to increase their number and to so direct them around their respective current elements as to cause them to follow the low reluctance path provided by the walls and to pass, outside the iron, above their respective current elements from one vertical wall to the other. Fig. 3 illustrates the path which the flux follows in and above the metal, it being understood that the lines 25 illustrated in Fig. 3 are those in one plane only and that there are similar lines established in each radial plane perpendicular to the path of the current, the total flux established being symmetrically distributed throughout the periphery of the parts (see Fig. 2). The lines of induction travel horizontally between the vertical walls, because of their tendency to follow a path of least reluctance and refraction of such lines as travel below the upper extremities of said walls when entering or leaving their inner surfaces. As observed, lines of induction pass directly through the metal M, the flux density (effective) becoming greater toward its upper surface. For reasons which will become apparent hereinafter, the flux density (effective) does not, however, increase linearly with decreasing depth in the metal. The character of its variation with changing depth in the metal is illustrated by the curve B′ in Fig. 14.

Experience shows that, whenever a magnetic body is placed in the electromagnetic field of a current-carrying conductor, a force is caused to act on the conductor, the direction of the force, in accordance with the well-established rule governing motion produced electromagnetically, being that in which motion causes an increase in magnetic energy (in the case under consideration, an increase of flux produced by the current flowing in the circuit of the conductor). Thus the magnetic walls 11 cause a downward tendency of motion of the metal M, as is axiomatic in view of the foregoing rule, it being observed that, were the metal M permitted to move downward, more flux lines 25 linking it would be established by the current in cooperation with said walls (because of a decrease in the reluctance of the magnetic path above the metal), with a resulting increase in magnetic energy. No force is actually exerted on the metal M at its upper surface, but the force tending to move it downward is distributed throughout its mass, i. e., should be considered as made up of an infinite number of infinitesimal unidirectional forces acting on its current-carrying elements. Explained in a different manner, each current-carrying element of the mass M, such as the element 26, is acted upon by a vertical downward force $f_2$ because, by moving downwards in accordance with said force, its circuit is linked by a greater number of flux lines 25. This system of downward forces $f_2$ may therefore be conveniently considered as being produced by the action of the interior flux 25 on the current-carrying elements. They may also be conceived as being produced by the mutual attractions of all of such elements, as modified by the presence of the magnetic walls 11. For the particular structure shown in Figs. 1 to 3 inclusive, they are cyclic forces the effective values of which act vertically downward. They increase in intensity toward the upper surface of the metal because of increasing flux density with decreasing depth.

Because of the comparatively low reluctance of the iron walls 11 as a whole and the comparatively small distance $w$ between the vertical walls 11a and 11b, all or substantially all of the flux generated by the current is caused to travel, as shown, from one of said vertical walls to the other so that the metal is subjected throughout its mass to the action of downward forces $f_2$. The less the distance $w$ is made, the greater becomes the strength of these forces. By locating the upper surface of the metal in the vicinity of the upper extremities of the vertical walls, greater advantage may be had of the magnetizing effect of the induced poles N and S (alternating in polarity), which tend to group at these upper extremities. It is understood, however, that the metal M may assume any level within the iron walls. If desired, it may even be caused to project above them by appropriate design of the mold 10. Downward forces $f_2$ may also be produced without the bottom wall 11c of the magnetic channel, if the vertical walls 11a and 11b are extended down sufficiently to cause the metal mass to lie above their median plane. The flux distribution in the metal and above it in this instance is the same as that shown in Fig. 3, except that less flux is produced, the high-reluctance gap between the vertical walls providing its path below the metal. The resulting treatment is therefore not as strong as when utilizing the complete magnetic channel, but the character of the treatment is nevertheless the same.

The treatment which takes place in the metal M as a result of the downward cyclic forces $f_2$ therein, will now be described in detail.

Generally stated, the pressure which is induced in a conductor by electromagnetic forces therein, is equal at any point to the summation of all forces which act toward the point. This induced pressure, like the natural pressure produced by the action of gravity, is hydrostatic, i. e., is equally transmitted at any point in all directions. In the case under consideration, because of the cyclic character of the forces $f_2$, the induced pressure in the metal M obviously varies with time. Moreover, as will be hereinafter shown, the forces $f_2$ are not in phase with one another and reverse in direction when passing through zero points of their waves. The instantaneous induced pressure at any point of the metal M is thus equal to the numerical sum of all instantaneous forces $f_2$ both directly above and below the point which act toward the point. Nevertheless, since the forces $f_2$ act predominantly downward, each nonconductive impurity in the metal M, such as the air bubble 27, is necessarily subjected to an induced buoyant effort equal to the effective difference between the vertical induced pressure wave components acting on it in an upward direction and those acting on it in a downward direction. That the buoyancy of the metal M on such impurities is actually increased by the forces $f_2$ therein, may be readily understood when it is taken into account that the induced pressure has a definite effective value at any point, the effective pressure necessarily increasing from the upper limit of the metal to its lower limit, it being zero at the upper surface (where the absolute pressure is still atmospheric) and maximum at the bottom. An induced pressure gradient is thus established in the metal M, which induced pressure gradient adds to the natural pressure gradient produced by the action of gravity, actually increasing the differential pressures acting on non-conductive impurities. Because of this increased buoyancy, upward travel of gas bubbles is accelerated to such an extent that their becoming entrapped in the metal is made impossible. Slag or formed oxides are also separated and forced to remain at the upper surface of the metal. In fact, any impurity, whether less or greater in specific gravity than the metal, may be forced to rise to the upper surface, provided it is non-conductive of current or less conductive than the metal.

The induced pressure gradient and hence the extent to which the buoyancy is increased, are governed by the magnitude of the downward forces $f2$, which in turn depend upon the distance $w$ and the strength of the current caused to pass through the metal. Considerable increase in buoyancy may be effected, an induced pressure gradient of many times the magnitude of action of the natural pressure gradient being possible. In the case of an aluminum ingot, for example, a total induced force of thirty times the weight of such ingot can be easily made to act on its mass. Therefore, the factors on which the induced pressure gradient depend may be readily adjusted in practice to the values required to effect whatever impurity elimination contemplated.

It is known that a conducting liquid mass is internally agitated by passage of an alternating current of sufficient strength therethrough. However, the character of the agitation which is produced in molten metal in accordance with the invention, has an improved effect with reference to the increased fluidity which is produced, because of its parallelism and uniformity of action. That is, the cyclic forces parallelly produced in the metal are the motive forces producing the agitation, and they accordingly cause parallel or substantially parallel relative displacements of all interior adjacent elements of the metal. Thus, because of the vertical production of the cyclic forces $f_2$ in the metal M, an up and down relative motion of adjacent elements of said metal takes place without interruption throughout its mass. The adherence between elements is therefore effectively eliminated, so that the viscosity of the molten metal is in all probability substantially neutralized. Like the increased buoyancy, the increased fluidity of the molten metal is an important result of the invention, gas and other impurities, which would normally be caused to remain in the metal, being permitted to pass freely and rapidly to its upper surface. It may be said that the increased buoyancy, in cooperation with the slippage of impurities relatively to adjacent mass elements caused by the agitation, force the impurities to rise immediately, this action being continuously repeated during their upward travel to the upper surface.

The method of treating metal described herein depends for its operation upon an elimination or a substantial elimination of all forces normally produced by passage of current, which have directions (effective directions in the case of alternating current) different from that of the useful forces introduced for treatment. For example, when passing a current, either direct or alternating, under normal conditions through a conductor, internal forces are invariably produced within the conductor, the directions (effective in the case of alternating current) of which converge radially inward toward an interior point. These converging forces must be eliminated, and an important advantage derived from the present invention resides in their elimination in the sense that their very formation is prevented. In the case of a ring conductor, such as the ingot M, the outward forces normally tending to increase its diameter are likewise eliminated. Such outward forces, if present and of large magnitude, would be particularly objectionable when treating an annular metal mass with the use of downward forces to increase its buoyancy, as in the apparatus of Figs. 1 to 3 inclusive.

The converging forces normally present in a current-carrying conductor may be said to be produced by the attraction of the current-carrying elements for each other, or by the action of the circularly directed field within the conductor on said elements. The induced pressure which they cause in the conductor is greatest at the interior point toward which they converge and decreases in all directions from this point toward the outer surface of the conductor, where it is zero. When acting alone in molten metal, the converging forces therefore tend to eliminate whatever beneficial effect is derived from the natural buoyancy of the metal, and may neutralize the natural buoyancy altogether if the current density is large enough. They are the motive forces agitating the metal when produced by alternating current, a pronounced stirring of the metal being produced, which acts to retard upward travel of impurities. That their formation is inherently prevented in the metal M, as a result of its enclosure within the magnetic channel 11, may be readily understood by a study of the modified character of the field correspondingly established in the metal. Referring to Fig. 3, the flux 25 represents the only flux or substantially the only flux established by the current flowing in the metal, and it is caused to travel directly through the metal from one vertical magnetic wall to the other. Internal forces are produced, but they no longer converge. Stated in other words, the forces $f_2$ are the original converging forces, but shifted in direction to act downward, as well as increased in magnitude because of the greater strength of the field established.

A phenomenon has been observed in low-frequency induction furnaces of the horizontal ring type, according to which the molten metal in the annular trough is acted upon by outwardly directed radial forces of such strength that, in certain cases, the bottom of the trough can be seen. In principle, this phenomenon is the same as that of a current-carrying circuit tending to enclose the largest possible area. That it is entirely absent in the iron-embedded ring of metal M can be understood by observing that an outward horizontal motion thereof produces no additional flux, i. e., no increase in magnetic energy. This elimination of outward forces also applies to any portion of the ring M, alone under treatment within magnetic walls of corresponding arcuate length, no other forces or substantially no other forces being present in the portion treated than the unidirectional useful forces produced in accordance with this invention.

Generally stated, the motive forces agitating a liquid mass carrying an alternating current, besides being cyclic forces, have different wave forms and are out of phase with one another at various points of the mass, which is probably the principal cause of the agitation. Under normal conditions of current passage, the motive forces are so directed and so differ in both wave form and phase at different points of the mass that no uniform agitation can possibly result. While the fluidity may be increased, yet the impurities in their travel from the interior are more or less impeded by the displacements of the mass elements. The freedom with which impurities may escape as a result of the agitation produced in accordance with this invention, is essentially due to its parallelism and uniformity of action throughout the molten mass, the displacements of the mass elements furthermore being caused to take place parallelly to the direction of travel of the impurities. The parallelism and uniformity of action of the agitation is due in great part to the fact that the motive forces all act parallelly to one another, but, when either forces $f_2$ alone or both forces $f_1$ and $f_2$ are employed, is believed to be also due to the distinct manner in which the motive forces differ as to wave form and phase from point to point in the mass. These phase and wave form variations and the phenomena associated therewith will now be described in connection with the downward forces $f_2$ produced by the apparatus shown in Figs. 1 to 3 inclusive.

When forces $f_2$ are produced in metal, the "skin-effect," or the tendency of an alternating current to distribute itself non-uniformly over the cross-section of a conductor, takes place in an entirely different manner than under normal conditions of current passage. Referring to Fig. 3, the magnetic walls 11 act to change the direction of the magnetic field, established by the current flowing in the metal M, both outside and inside said metal, the interior flux lines 25 being caused to travel directly through the metal parallelly to the exterior lines 25. The lower elements of the metal are linked by a greater number of flux lines than the upper elements, so that the lower elements have greater self-inductances than the upper elements. The self-induced back electromotive forces or opposing voltages of self-induction are greater in the lower elements than in the upper elements; and, instead of the current being forced outwardly in all directions toward the complete extent of the outer surface or "skin" of the conductor, as normally takes place, it is so distributed that the current density is greatest only at the upper surface of the metal. The current density increases continuously with decreasing depth in the metal; and, with this current distribution, there occurs a changed flux distribution, the total flux inside the metal being reduced. The curves I' and B', shown respectively in Figs. 15 and 14, are examples of the altered conditions in the metal. Effective values at various depths are given by each of these two curves, the straight lines I and B representing the corresponding current and flux distributions which would be effected if, instead of alternating current, a direct current of the same total magnitude were passed through the metal. The variations with depth indicated by the curves I' and B' become more pronounced with decreasing distance $k$ between the upper extremities of the walls 11 and the upper surface of the metal.

Because of increasing self-inductance with increasing depth, the currents in the lower elements lag behind the currents in the upper elements, thus causing the densities of magnetic flux 25 produced at various depths to be not only out of phase with one another, but also out of phase with the currents with which they act to produce the cyclic forces $f_2$. Fig. 13 illustrates the phase relation between flux density and current waves at a given element and the wave of force $f_2$ correspondingly produced. The flux density lags behind the current; and, because of the difference in phase, the force $f_2$ produced on the element reverses in direction when passing through zero points of its wave. In other words, the wave of force $f_2$ comprises, for each cycle of current, two portions $a$ through which the force acts upward on the element and two portions $b$ through which it predominantly acts downward thereon. The various forces $f_2$ produced in the metal M each assume a wave form of the same general character; but, because of increasing phase difference between flux density and current waves with decreasing depth, the upwardly acting portions $a$ of their waves increase in both amplitude and time-period of action from the lower limit of the metal to its upper limit. Further, the forces $f_2$ on the lower elements lag behind the forces $f_2$ on the upper elements, the lag increasing continuously with increasing depth. It is thus seen that the induced pressure at a given point in the metal, or the summation of the forces $f_2$ directed toward that point, is out of phase with and has a wave form different from the induced pressure at any other point of different depth. That is, the induced pressure, like the forces $f_2$ which produce it, experiences gradual changes in both phase and wave form throughout the vertical distance between the upper and lower limits of the metal. It is these phase and wave form variations which, it is believed, at least in part cause the agitation and in part cause its parallelism and uniformity of action throughout the treated mass and the resulting improved effect of increased fluidity of such mass.

It should be observed that the forces $f_2$ in the metal M and the effects which they create therein, are somewhat stronger at the inner side surface than at the outer side surface, which is due to increasing flux density (see Fig. 2) and increasing current (because of decreasing resistance), with decreasing diameter of the conducting elements. While the variation in strength or amplitude of action which the forces $f_2$ experience in radial directions is but slight, the changes in phase and wave form which they also experience in these directions are even slighter.

When producing the treatment with the use of alternating current, there is also the possibility of eddy currents being formed in the metal as a result of the varying flux therein. That is, eddy currents are formed whenever the metal under treatment by cyclic forces is of such a character as to present other than an endless path for the load current. Thus, with the magnetic channel 11 completely enclosing the annular metal body M (except for the slight fraction thereof corresponding to the radial slot 24), no eddy currents or substantially no eddy currents are established because the structure provides no path for their flow. However, should the channel 11 be caused to extend only along a portion of the periphery of the metal ring M, eddy currents are then formed in that portion, circulating in closed paths linked by the interior lines of flux. These induced currents may be established regardless of the method used for producing the forces required for the treatment, and their production is accompanied by more pronounced current density variation, as well as increased agitation. Their effect on the resulting current distribution in the metal when downward forces are employed, is shown by the curve I'' in Fig. 15, which curve includes the skin-effect already discussed, it being observed that the eddy currents have the same tendency as the skin-effect of forcing the current toward the top.

Eddy currents may, of course, be established in a conducting mass under normal conditions of current passage therethrough, but these tend to force the current toward the complete outer surface of the mass, as well as cause greater unevenness of the agitation. The eddy currents established in metal under treatment by cyclic forces parallelly produced therein in accordance with the invention will be hereinafter more fully discussed in connection with the apparatus shown in Figs. 4 and 5.

Quite an appreciable current density variation may be caused to take place in a conductor carrying an alternating current as a result of skin-effect, or skin-effect and eddy currents, it being observed that skin-effect and eddy currents become more pronounced the larger the cross-section of the conductor. As will be hereinafter shown, current density variation also accompanies the production of cyclic forces $f_1$ in metal; and it may be generally stated that the current density in metal under treatment by cyclic forces parallelly produced therein in accordance with the invention, increases in a direction opposite to that in which such forces are caused to act predominantly, regardless of the particular manner in which the forces are produced. Observing that heat produced by electric current is proportional to its square, it is thus apparent that by the invention there is effected a considerable increase of temperature, along with the increase of current density, in the direction in which impurities are eliminated. In Fig. 3, for example, a pronounced increase of temperature is effected from the bottom of the metal M to its upper surface, a substantially even temperature being nevertheless maintained at all points of equal depth. The temperature gradient thus established in the metal under treatment may have a certain contributing effect on the agitation, but its most important advantage resides in the progressive solidification of the metal which it causes in the direction of impurity elimination, when treatment is continued during the cooling stage.

As the initial steps of the procedure which is preferably followed in the production of a casting, the metal in its mold is caused to be treated while it is filling the mold during the pouring operation and also for a certain length of time after the pouring operation while the metal remains in molten condition in the mold. Thus, the control switch 19 (Fig. 1) is closed before pouring the metal in the mold 10, and the tap-switch 22 may be initially adjusted before starting to pour the metal, or controlled while pouring the metal, so as to retain the final mass in the mold liquid for the period of time desired. As a result of the treatment during the pouring operation, there is much less tendency of impurities being trapped in the metal, the increased buoyancy of the metal checking the downward advance of bubbles formed by the carrying of air along with the mass into the mold. The same applies to the carrying downwardly of slag particles. The treatment of the metal for a certain length of time after it has been cast in the mold results in still greater freedom from impurities.

Another feature of the invention comprises continuing the treatment while the metal is cooling in its mold, the current being preferably controlled to insure slow cooling of the metal while undergoing solidification. This step is particularly intended to eliminate the gases which have been absorbed by the metal during the melting stage and which the metal tends to eject when solidifying. Thus, because of the temperature gradient in the metal M, it is caused to solidify progressively from the bottom upwards. As a result, the gases, immediately upon taking form at each solidifying layer, are permitted to pass freely upward to the atmosphere. In fact, the evolution of gases takes place slightly above the layer which has solidified, so that the treatment has the effect of crowding the gases out as they are formed. If desired, the flow of current is continued while the casting is cooling beyond the stage of solidification, it being observed that in this manner the temperature gradient is taken full advantage of in preventing defects due to uneven cooling. That is, because of the substantially even temperature at all points of equal depth, the temperature gradient is also most effective in preventing such casting defects as cracking, piping, lapping, etc., normally caused by uneven cooling. The flow of current is therefore preferably continued until the metal has cooled to an extent corresponding to which defects due to uneven cooling no longer tend to take place. The top-switch 22 enables the rate of cooling to be controlled as desired.

Figs. 4 and 5 illustrate a metallic mold 29 for the production of rectilinear ingots, comprising a rectangular bottom 30, sides 31, and ends 34. It is removably positioned on a seat 35 of refractory material within magnetic walls 36, which may conveniently take the form of a channel consisting of upright parallel portions 36a joined by a bottom rectangular portion 36b. At its ends 34 the mold is adapted to make removable contact with conducting plates 37 in electrical connection through conductors 39 with a suitable source of power (not shown). Preferably, the bottom 30 and the sides 31 of the mold are made of a high resistivity alloy and the ends 34 of a comparatively low resistivity material. The mass of metal M1 shown in the mold 29 may have been poured by gravity therein, the current derived from the source obviously passing directly through the mass from one end 34 of the mold to the other. The conductors 39 leading to the source should not be made to pass above the metal M1 or in proximity thereto.

The lines 40 illustrate the flux which the current in the metal M1 establishes (outside the iron) in cooperation with the channel 36. This flux travels through and above the metal M1 in a manner identical to that which has already been described in connection with the flux 25 produced by the apparatus of Figs. 1 to 3 inclusive, except that the lines of induction in the present instance are situated in parallel planes instead of radial planes. Whether direct or alternating current is caused to flow in the metal M1, forces $f_2$ of downward action are caused to be produced therein, the converging forces normally produced by passage of current being eliminated.

That the buoyancy of the metal M1 is increased if direct current is employed, may be readily understood by observing that the downward forces $f_2$ are then of steady character and the induced pressure at any point consequently equals the sum of the forces $f_2$ directly above the point. Because of the steady character of the forces $f_2$, no agitation is produced such as is contemplated by the invention, substantially no increase in fluidity being obtained.

However, if alternating current is caused to flow in the metal M1, increased fluidity, as well as increased buoyancy, is obtained; and it should be observed that the phenomena in connection with which the agitation is produced involve both skin-effect and eddy currents. Since the field in the metal M1 is horizontal, the eddy currents flow in vertical planes, following the top surface of the metal along its upper filaments and returning in the opposite direction along its lower filaments, as illustrated by the closed loops *e* in Fig. 6. They are out of phase with each other, and the magnetic fluxes which they produce are likewise out of phase with each other. Nevertheless they predominantly act to assist the load current *i* at the top of the metal and to oppose it at the bottom. Further, they increase in strength toward the top and bottom. The effective density of total current in the metal M1 therefore undergoes the variation with depth indicated by the curve I'' in Fig. 15, the corresponding distribution of effective density of resultant flux being indicated by the curve B'' in Fig. 14, each curve having additional reference to the skin-effect also produced. At any point of the metal the density of resultant flux is out of phase with the resultant current, the forces $f_2$ correspondingly produced on the current-carrying elements still assuming the general character of wave illustrated in Fig. 13. The difference in phase between flux density and current varies continuously with changing depth, but this variation is more pronounced than when skin-effect alone is produced. The induced pressure in the metal correspondingly experiences, with changing depth, more pronounced changes in both phase and wave form. Because of eddy currents, therefore, the agitation of the metal M1 is increased, but is characterized by the same parallelism and uniformity of action as when skin-effect alone is produced. Because of the action of the field on the eddy currents, inwardly or oppositely directed forces are produced at the end portions of the metal, which forces, however, are substantially neutralized by the downward or unidirectional forces also present.

It is understood that, by proper control of the current, the metal M1 may be treated during the pouring operation and thereafter while cooling during and beyond the stage of solidification, in the same manner as has already been described in connection with the metal M. If alternating current is employed, expulsion of gases suddenly evolved near solidification is again facilitated by the temperature gradient, it being observed that both skin-effect and eddy currents establish the temperature gradient in the metal M1. Defects due to uneven cooling are effectively eliminated even when direct current is employed, which is due to the uniform or substantially uniform temperature maintained throughout the metal M1 at any instant.

The apparatus shown in Figs. 7 and 8 comprises a mold 46 identical in form to the mold 29 heretofore described. The mold 46 should not be made of magnetic material. It is shown as containing the metal M2 to undergo treatment and as being removably positioned lengthwise in the air gap 47 formed between the jaws of an electromagnet 48, which is so constructed that, when current is caused to flow through its coil 49, a cross-flux 50 is caused to be produced in the metal M2 throughout its mass. As before, current is conducted to the mold by removable end plates 51 and conductors 52 leading therefrom to a suitable supply (not shown), this current being at right angles to the flux 50.

Experience shows that when a current-carrying conductor is disposed in a magnetic field (other than its own) having a direction transverse to the path of the current in the conductor, a force is caused to be exerted on the conductor, the direction of the force, according to the rule already stated, being that in which motion causes an increase in magnetic energy (here, either an increase or a decrease of the flux, peculiar to said field, as links the circuit of the conductor, depending on certain conditions including the relative directions of said current and field). By properly directing the currents in the metal M2 and winding 49, a downward tendency of motion of the metal M2 may thus be produced. In other words, assuming the proper relative directions of flux and current in the metal M2, it will be acted upon by a downward force since, were it to move in accordance with such force, the circuit of the metal (including the conductors 52 and current source) would be linked either by a greater or by a smaller number of flux lines 50 (depending on the manner the conductors 52 are brought away from the apparatus), in either case with a resulting increase in magnetic energy. Again, no force is actually exerted on the metal at its upper surface, the total force acting on it being actually a system of downward forces infinite in number, acting on its current-carrying elements. In other words, each current-carrying element of the metal M2, such as the element 53, is acted upon by a downward force $f_1$, which may be conveniently considered as being produced by the action of the interior flux 50 at the element on the current therein. If steady forces $f_1$ are desired, a direct current is passed through the mass M2 and a direct current is passed through the winding 49. If cyclic forces $f_1$ are desired, an alternating current is passed through the mass M2 and an alternating current is passed through the winding 49. Direct current cannot be used in one circuit and alternating current in the other. When cyclic forces are produced, their effective values are greatest for given effective values of current in the metal and flux 50 therethrough, when the flux 50 has the same frequency as and is in phase with the current in the metal.

It is to be particularly noted that, because of the proximity of the electromagnet core, the field produced by the current passed through the metal M2 (not shown) is modified in both direction and intensity. It is not necessarily modified to advantage. That is, the forces normally produced by passage of current may still be variously directed and, if converted into unidirectional forces, may not act in the proper direction. Conversion of the normal forces into forces $f_2$ of the proper direction depends on the geometrical relation of the electromagnet core and on the manner the conductors 52 are brought away from the apparatus. If the field produced by the current passed through the metal M2 is not modified to cause this conversion to take place or to take place to a sufficient extent throughout the metal M2, then it is necessary that the ampere-turns of the electromagnet 48 be made of sufficient magnitude to cause its neutralization or substantial neutralization. That is, the resultant flux in the metal M2 should be caused to be substantially the same, in direction, as the useful flux 50. In any case, therefore, the normal forces will be eliminated or substantially eliminated, the only forces in the metal being the unidirectional or substantially unidirectional forces produced by the resultant flux therein. It should be observed that, when the field produced by the current passed through the metal is not modified to advantage, its neutralization or substantial neutralization will in many cases necessitate employing such relative values of current through the metal and ampere-turns of electromagnet that the resultant flux will be caused to approximate the flux 50 in both direction and intensity. The actual forces in the metal will then approximate the useful forces $f_1$ in both direction and intensity.

A skin-effect similar to that which has been described, also results from the introduction of parallel cyclic forces $f_1$ in metal. That is, a skin-effect inherent in the production of forces $f_1$, and independent of that corresponding to the production of forces $f_2$, takes place because of transformer action between the circuit employed to establish the flux required for producing the forces $f_1$ and the individual circuits of the conducting elements composing the metal. Thus, the circuits of the various elements of the metal M2 are not all linked by the same number of flux lines 50. Depending on the manner the conductors 52 are brought away from the apparatus, the circuits of the lower elements are linked either by a greater or by a smaller number of flux lines 50 than the circuits of the upper elements, so that the mutually-induced electromotive forces or voltages of mutual induction are either higher or lower in the lower elements than in the upper elements. Because of the different self-inductances of the various conducting elements, the induced currents caused to be established by this transformer action will not be in phase with one another and will be more or less affected in strength. Nevertheless, depending on the manner the conductors 52 are brought away from the apparatus, these currents are either stronger or weaker in the lower elements than in the upper elements: if stronger in the lower elements than in the upper elements, they act predominantly to oppose the current passed through the metal; and, if weaker in the lower elements than in the upper elements, they act predominantly to assist the current passed through the metal. In either case, therefore, the density of resultant current will increase from the bottom of the metal to its top. The flux 50 in the above discussion should be considered as the resultant flux produced by the current in the coil 49 acting as a primary and the induced currents in the metal elements acting as secondaries (including leakage flux produced by the induced currents). It has not the uniform distribution indicated in Fig. 8 (only true when direct current is employed), but varies in both density and phase from point to point in the metal. Like the skin-effect resulting from the production of cyclic forces $f_2$ of downward effective action, the skin-effect resulting from the production of cyclic forces $f_1$ of downward effective action becomes more pronounced the higher the level to which the metal is raised within the magnetic body or bodies which partially surround it.

The flux 50 also induces eddy currents in the metal M2 if alternating current is employed. As before, these interior currents flow in closed paths linked by the interior flux which induces them. Like the currents induced in the circuits of the conducting elements, the eddy currents act to increase the current density at the top of the metal M2 and decrease it at the bottom. They also are not in phase with one another and alter the distribution and phase of the flux in the metal.

Depending on the phase relation of the currents passed through coil 49 and metal M2, either one of three possible phase relations between the waves of resultant current and density of flux 50 may be caused at a given point in the metal. The current may lag behind the flux density as illustrated in Fig. 11, or may be in phase with the flux density as illustrated in Fig. 12, or may lead the flux density as illustrated in Fig. 13. In Figs. 11 and 13, the generated force $f_1$ will act upward through recurrent portions of its wave, but in Fig. 12 it will act downward at any instant, except when passing through zero. Whichever one of the three conditions illustrated is present at a given point in the metal, the phase relation between flux density and current waves will nevertheless change continuously from point to point. Correspondingly, the various forces $f_1$ produced will differ continuously in both phase and wave form from point to point and therefore act to produce internal agitation of the metal.

Generally stated, cyclic forces $f_1$ produced in metal in accordance with the invention, because of their parallelism, produce or contribute to an agitation which, like that produced by forces $f_2$ alone, is believed to be very effective in providing the contemplated effect of increased fluidity of the metal. However, the agitation is most effective, it is believed, when the field produced by the current passed through the metal is modified to advantage with corresponding production of forces $f_2$. That is, greater uniformity and parallelism of action is obtained, the phase and wave form variations of the resultant forces producing the agitation being then identical in character to those which have been described in connection with the production of cyclic forces $f_2$. Thus, assuming the field produced by the current passed through the metal M2 to be modified to advantage, the self-inductances of the various conducting elements of the metal then have the same value at all points of equal depth, but continuously differ in value between the upper and lower limits of the metal. Correspondingly, the various forces $f_1$ produced are in phase and have the same wave form at all points of equal depth (strictly true only when the metal under treatment is rectilinear), but continuously differ in both phase and wave form between the upper and lower limits of the metal. Now these phase and wave form variations are the same in character as those of the forces $f_2$, also produced under the assumed condition, and it therefore follows that the resultant forces in the metal M2, even though their components $f_1$ and $f_2$ are not in phase, also undergo phase and wave form variations of identical character with changing depth in the metal. The resulting agitation is more intense because of the production of both forces $f_1$ and $f_2$, but is characterized by the same uniformity and parallelism of action as when forces $f_2$ alone are employed. In the case of the metal M2, both skin-effect and eddy currents (resulting from the production of both forces $f_1$ and $f_2$) contribute to this agitation. It should be further observed that, when the field produced by the current passed through the metal is modified to advantage, the current density variation also takes place more uniformly. That is, the current density is the same or substantially the same at points of equal depth. Moreover, the character of the variation between the upper and lower limits of the metal is the same as that when forces $f_2$ alone are employed. The curves I' and I'' in Fig. 15 therefore apply to current density gradient effected in metal when either cyclic forces $f_2$ or both cyclic forces $f_1$ and $f_2$ are downwardly produced therein, the curve I' having reference to skin-effect alone and the curve I'' to both skin-effect and eddy currents. It is, of course, understood that the extent of the current density variation is considerably more pronounced when both forces $f_1$ and $f_2$ are produced.

The various effects which may be caused in the metal M2 now become apparent. The forces $f_1$, whether steady or cyclic, obviously increase the gradient of pressure and consequently the buoyancy of the metal. If cyclic, they also increase the fluidity of the metal and produce temperature gradient therein. If the field produced by the current passed through the metal is modified to advantage, the forces $f_2$ correspondingly produced contribute to the treatment, it being understood that both increased buoyancy and fluidity are then produced by the resultant forces. If, on the other hand, the field produced by the current passed through the metal is not modified to advantage, by its neutralization, it can have no effect on the character of the treatment, the latter being carried out by forces approximating the forces $f_1$ in direction. The metal M2 may of course be treated during the pouring operation and thereafter, in accordance with the procedure already described.

In Fig. 9 I have illustrated a simple apparatus which may be utilized when it is desired to introduce both forces $f_1$ and $f_2$ in metal. Here a magnetic channel 60, comprising side walls 60a and a bottom wall 60b, encloses both the metal M3 to undergo treatment and a bar conductor 62 located below the metal. A mold 61 is shown containing the metal M3, currents I1 and I2 being caused to pass through the conductor 62 and metal M3, respectively. The figure is a vertical section through the structure illustrated, it being understood that the two currents flow through their respective conducting bodies along their lengths, i. e., perpendicularly to the plane of the figure. It is essential that the same direction of current flow be caused in the two conducting bodies. The current I2, in cooperation with the walls 60, establishes the flux 63 (shown in full lines), downward forces $f_2$ being therefore produced in the metal M3 in the manner already described. The current I1, in cooperation with the walls 60, establishes the flux 64 (shown in dotted lines), downward forces $f_1$ being therefore produced in the metal M3 in the manner already described. The fluxes 63 and 64 are shown only for convenience in description, it being understood that the actual flux is the resultant of the two fluxes and that the density of the resultant flux increases continuously from the bottom of the metal to its top. Each current-carrying element of the mass M3 is acted upon by a resultant downward force $f_1+f_2$ actually produced by the resultant flux. The currents I1 and I2 may be either both direct or both alternating. In the latter case, they should preferably be in phase or substantially in phase with one another. If derived from the same alternating-current source, they will be more or less out of phase, with the current I1 lagging behind the current I2.

As before, the increased fluidity of the metal M3 and the temperature gradient therein are effected only with alternating current and the increased buoyancy with either direct or alternating current. If the metal M3 is non-annular, both skin-effect and eddy currents (resulting from the production of both forces $f_1$ and $f_2$) will take place when alternating current is employed.

Besides the increased strength of the treatment derived by employing both forces $f_1$ and $f_2$ in the metal, the apparatus of Fig. 9 provides the distinct advantage that all flux in the metal is caused to be uniformly directed therethrough. Flux produced by currents induced in the metal travels horizontally and links the lower conductor 62 (through the walls 60), no leakage flux being produced. The various effects which may be created in the metal M3, are most uniform.

It is understood that, in the same manner as stated in connection with the apparatus of Figs. 1 to 3 inclusive, the bottom portions 60b of the magnetic structure may be omitted, provided the metal M3 is treated above the median plane of the side portions 60a. The same modification applies to the apparatus shown in Figs. 4 and 5. If desired, the molds in the various structures described may be fitted with non-magnetic lids (not shown).

Best results of the treatment effected by the invention are obtained when the forces electromagnetically induced in the metal ($f_1$ or $f_2$) are caused to be vertically downwardly directed, as in the structures illustrated and described herein. Only under this condition can increased buoyancy be obtained, which likewise applies to temperature gradient causing progressive solidification from the bottom upwards. Moreover, it is believed that the agitation is then most effective in increasing fluidity. When the electromagnetic forces are inclined, their lateral or horizontal components have a tendency to cause a stirring or circulation of the molten metal. On the other hand, when the electromagnetic forces act vertically downwards, they add directly to the weight of the mass elements, thereby causing more linear and parallel displacements of the mass elements.

The various pressure gradients shown in Fig. 16 are relative to atmospheric pressure. The curves P1 to P1'' are the pressure gradients contributed by downward forces $f_1$ under certain conditions of treatment, while the curves P2 to P2'' represent the pressure gradients contributed by downward forces $f_2$ under corresponding conditions. In each of these six curves the induced pressure is seen to start from zero at the top of the metal and to increase continuously to a maximum at the bottom, being similar in this respect to the natural pressure gradient P*n*. The curves shown in Fig. 17 illustrate the corresponding buoyancies which the foregoing pressure gradients effect in the metal. The curves E1 to E2'' correspond to the curves P1 to P2'', respectively. The curves E*n* illustrates the effect created by the natural pressure gradient P*n*. For a clear conception of the curves of Fig. 17, it should be understood that buoyant effort, natural or induced, has reference to differential pressure exerted by a liquid on a body immersed therein and can therefore only be measured in terms of the volume of liquid displaced by the body (the volume of the body except upon emergence of the body from the liquid). The various effects illustrated in Fig. 17 are therefore given with reference to an interior body or impurity of given size in the metal. The same impurity should be considered as being acted upon in each curve. It should also be recognized that while buoyant effort, natural or induced, is actually a system of parallel forces, infinite in number, it may nevertheless be replaced by a single or resultant force acting on an interior point in the body. This point is termed center of buoyancy. The center of natural buoyancy coincides with the center of gravity of the volume of liquid displaced by the body, but this is not always true of the center of induced buoyancy. The curves of Fig. 17 each give variation of buoyant effort with changing depth occupied by the center of buoyancy in the impurity. Buoyant effort is also proportional to rate of pressure variation in the liquid. In each of the curves of Fig. 17, the buoyant effort at a given depth is therefore the product of the slope of the corresponding pressure gradient at that depth by the volume of metal displaced by the impurity. Only when the buoyant effort relation with depth is linear (E*n*, E1, and E2), is the center of buoyancy located at the center of gravity of the volume of metal displaced by the impurity. Only when the impurity is of comparatively small size, may it be considered in all cases as being acted upon at the center of gravity of the volume of metal displaced by the impurity. In each of the curves of Fig. 17, the buoyant effort is seen to decrease abruptly near the upper surface of the metal. This is due to emergence of the impurity, the buoyant effort finally becoming zero at the upper surface if the impurity is a gas (which is assumed). Figs. 16 and 17 clearly indicate the extent to which pressure gradient and buoyancy may be increased in metal by the treatment of the present invention. It is of course understood that the curves P1 to P1'' and E1 to E1'' are given in connection with pressure and buoyant effort inherent in the production of forces $f_1$ only, and that the curves P2 to P2'' and E2 to E2'' are given in connection with pressure and buoyant effort inherent in the production of forces $f_2$ only.

The curves P1 and E1 are obtained when the forces $f_1$ are steady, the field required for producing such forces being assumed of uniform intensity (as in Fig. 8). As observed, the induced pressure varies linearly, being similar in this respect to the natural pressure P*n*. Correspondingly, the induced buoyant effort, like the natural buoyant effort E*n*, is constant at all depths occupied by the impurity (except upon emergence of the impurity). For the particular apparatus shown in Fig. 9 and a metal M3 therein of rectilinear length and rectangular cross-section, the curves P1 and E1 have the following equations:

$$P1=\frac{4\pi I_1 I_2}{\omega t h}\times d \qquad \text{per unit area}$$

and $$E1=\frac{4\pi I_1 I_2}{\omega t h}\times V$$

where:

I1=the current in the bottom conductor 62,
I2=the current in the metal M3,
$\omega$=the distance between the vertical walls 60*a*,
*t*=the width of the metal M3,
*h*=the height of the metal M3,
*d*=the depth in the metal M3, and
*V*=the volume of metal displaced by the impurity.

The curves P1' and P1'' illustrate the character of the pressure variation and the curves E1' and E1'' the character of the buoyant effort variation, when the forces $f_1$ are cyclic (the field produced by the current passed through the metal being assumed modified to advantage). The curves P1' and E1' have reference to skin-effect alone and the curves P1'' and E1'' to both skin-effect and eddy currents. Only skin-effect and eddy currents inherent in the production of forces $f_1$ should be considered. As observed, the pressure variation in either case is no longer linear, both the skin-effect and the eddy currents acting to force the buoyant effort toward the top of the metal. It is understood that the curves P1' and P1'' have reference to effective pressure and the curves E1' and E1'' to effective buoyant effort.

The curves P2 and E2 are obtained when the forces $f_2$ employed are steady, a field of the character for example illustrated in Fig. 5 being assumed. Here the induced pressure gradient bends down appreciably with increasing depth in the metal. Its slope is zero at the bottom, but increases continuously (and linearly) from the bottom to the top. Correspondingly, the induced buoyant effort is comparatively small at the point of lowermost depth occupied by the impurity (theoretically zero for an impurity of infinitesimal size), but increases rapidly and linearly toward the upper surface. This is a desirable feature (when direct current is employed) in view of the fact that, as the impurity gains momentum in its travel to the atmosphere, the opposing or frictional force which it encounters due to the viscosity of the liquid metal, increases rapidly. For the apparatus for example illustrated in Fig. 9 and a metal M3 therein of rectilinear length and rectangular cross-section, the curves P2 and E2 have the following equations:

$$P2=\frac{2\pi I_2^2}{\omega t h^2}\times(2h-d)d \quad \text{per unit area}$$

and $$E2=\frac{4\pi I_2^2}{\omega t h^2}\times V(h-d)$$

(For definition of symbols see foregoing equations for P1 and E1.)

The curves P2′ and P2″ illustrate the character of the pressure variation and the curves E2′ and E2″ the character of the buoyant effort variation, when the forces $f_2$ are cyclic. The curves P2′ and E2′ correspond to skin-effect alone and the curves P2″ and E2″ to skin-effect and eddy currents. Only skin-effect and eddy currents inherent in the production of forces $f_2$ should be considered. In either case more pronounced drooping of pressure with increasing depth is caused. The buoyant effort variation is no longer linear, both the skin-effect and the eddy currents acting to force the buoyant effort toward the top. As before, the curves P2′ and P2″ apply to effective pressure and the curves E2′ and E2″ to effective buoyant effort.

In either Fig. 16 or 17, corresponding curves respectively appertaining to cyclic forces $f_1$ and $f_2$ are not, strictly speaking, additive. For example, when skin-effect alone takes place in the metal M3 (Fig. 9), the sum of the curves P1′ and P2′ is not the resultant gradient of induced pressure, and the sum of the curves E1′ and E2′ is not the resultant gradient of induced buoyant effort. This is due to the fact that the forces $f_1$ and $f_2$ are not in phase, the actual treatment being effected by their resultants, as already stated. On the other hand, summation of curves does approximate the resulting conditions when alternating current is employed, and is strictly accurate when direct current is employed. Thus, when direct current is employed in Fig. 9, the resultant gradient of induced pressure is the sum of the curves P1 and P2, and the resultant gradient of induced buoyant effort is the sum of the curves E1 and E2. Obviously, in any case, the total gradient of pressure is obtained by adding the curve P*n* to the resultant gradient of induced pressure, and the total gradient of buoyant effort is obtained by adding the curve E*n* to the resultant gradient of induced buoyant effort.

It is understood that the various induced pressure and buoyant effort curves of Figs. 16 and 17 are merely illustrative of treatments which may be carried out in the specific apparatus shown in the drawings, and should not be construed in any way as limiting the invention to these particular treatments.

The foregoing description has been particularly concerned with the production of electromagnetic forces directed vertically downwards in the body of metal to be treated. It is understood, however, that electromagnetic forces of any single direction, $f_1$ or $f_2$, may be satisfactorily utilized for the treatment, provided the converging forces normally produced by passage of current are eliminated. Thus, the pressure gradient introduced by the unidirectional forces employed will, in any case, add vectorially to the pressure gradient normally produced by gravity, so that a resultant pressure gradient is created in the metal, causing the impurities to move from its interior in most cases in a direction opposite or generally opposite to that in which the resultant pressure increases. In certain cases, however, it may be only necessary to reduce or neutralize the pressure gradient in the metal, whereby the impurities are caused to move in the same direction or same general direction as that in which the resultant pressure increases or to move under the influence of gravity alone. For example, when the impurities to be removed are greater in specific gravity than the metal, the electromagnetic forces may be made to act vertically upwards to oppose or neutralize the natural buoyancy of the metal, so that these heavier impurities are caused to sink to the bottom. On the other hand, upward forces of sufficient strength, whether vertical or inclined, may be utilized to set up an increased pressure gradient which will then act to remove interior impurities, whether greater or less in specific gravity than the treated metal, in a direction or general direction opposite to that in which the resultant pressure increases. In any case, the impurities are caused to move in a direction or general direction opposite to that in which the electromagnetic forces are caused to act or in which the induced pressure increases; and, by effecting the proper direction and intensity of the electromagnetic forces, an induced pressure gradient is obtained of the required direction and magnitude of action to suit the particular conditions of operation desired. Generally stated, my method of treating metal consists in electromagnetically introducing therein unidirectional or substantially unidirectional forces in such a manner that the forces of varied directions normally produced by passage of current are eliminated or substantially eliminated.

In accordance with the invention, metal may be treated by electromagnetic forces, cast into a mold by the pressure produced by said forces, and while in the mold further subjected to electromagnetic treatment. An apparatus is illustrated in Fig. 10 for the production of a metal ring ingot in this manner. Referring to this figure, an annular mass of metal M4 and its container or crucible 65 are shown disposed around an iron core 66 (shown in part), which, it is understood, may form part of a transformer identical in construction and primary circuit connections to that of Fig. 1. The metal M4 may be melted in its container by the current I4 induced therein or may be poured already in a liquid condition therein. The crucible 65 is adapted to be removably positioned on an annular mold 67, also disposed around the core 66, and in this position communicates therewith by openings or ducts 70 (one being shown in the drawings), formed at arcuate intervals from the bottom of its trough 68. Both the crucible 65 and the mold 67 are positioned within a magnetic channel 71, similar in construction to the channel 11 of Fig. 1. A gate or valve 75 is provided for each of the ducts 70, each gate being slidable within a lateral opening 76 formed in the body 65 and operable by a handle 77 extending outwardly through a vertical slot 78 formed in the outer wall 71*b* of the channel 71. Each gate 75 has an opening 79 formed therethrough. In their outer positions the gates 75 prevent flow of metal from the trough 68, but when displaced to their inner positions, their openings 79 are caused to register with the ducts 70 through which metal may then flow. These gates also provide means for separating the cast metal M5 in the mold 67 from the remaining mass of metal in the trough 68.

Because of the magnetic channel 71, the current I4 introduces cyclic forces $f_2$ of downward effective action in the metal M4. When melting or pouring the metal M4 in the crucible trough 68, the gates 75 are in closed positions. The metal is thus initially subjected in the trough 68 to the treatment provided by the forces $f_2$ therein; and, upon opening the gates 75, the increased pressure in the metal M4 causes a portion thereof to pass through the ducts 70 into the mold 67 to form the required ring casting M5. In view of the treatment effected in the upper metal M4, the air displaced from the mold 67 during this casting operation travels in the opposite direction and finds an easy upward path through said metal M4 to the atmosphere.

Incident to passage of metal into the mold 67, a circuit is established around the transformer core and a current I5 is induced therein by transformer action. Because of the magnetic channel 71, this current I5 introduces cyclic forces $f_2$ of downward effective action in the poured metal M5, which is accordingly treated as it fills the mold 67, air or gas bubbles, as soon as formed therein, being caused to travel rapidly therefrom and through the upper metal M4 to the atmosphere. It is also noted that the current I5 in the metal M5, because of the magnetic channel 71, also sets up additional cyclic forces $f_1$ of downward effective action in the metal M4, so that increased casting pressure, as well as more pronounced treatment of the metal M4, is obtained. When the mold 67 is completely filled, the pressure at the upper surface of the cast metal M5 is no longer atmospheric, but this does not in any way alter the character of the treatment to which it is subjected. Both its buoyancy and fluidity are still increased as a result of the cyclic forces $f_2$ internally produced in its mass.

This method of producing a casting is particularly advantageous in that the metal enters the mold in an ideal condition because of its initial treatment. There is no slag to be removed from the upper surface of the casting M5, and its configuration is exact because of the casting pressure employed in producing it. Another advantage of this method is an accurate control of the casting temperature. Thus, the current in the body of casting metal M4 may be so controlled at the time of opening the gates 75 that metal therefrom may enter the mold 67 at the temperature desired. Still another advantage resides in the uniform flow of metal into the mold. Further, the rate of flow may be controlled by suitably adjusting the position of each gate 75 or by leaving a certain number of them completely closed, so that the period of time the metal undergoes treatment while it fills the mold may be varied as desired.

The metal M5 may be kept in a molten condition and its treatment continued for a certain length of time after the mold 67 is completely filled, and thereafter the valves 75 are all closed. The casting should preferably be under treatment as it undergoes solidification. Further treatment, after solidification, may be effected to prevent defects due to uneven cooling.

Castings may be indefinitely produced from the trough 68 by adding more metal therein when required. Any oxides or other impurities below the added metal are caused to rise to the upper surface of the total mass of metal when melted, so that the mass of metal remaining in the trough 68 after a casting operation is always in an ideal condition to produce the next casting.

Obviously, where the treatment of the invention is carried out with alternating current, the magnetic body or bodies employed in producing the flux through the current-carrying metal may be of the customary laminated construction to minimize the eddy current loss therein, which of course applies to any of the structures which have been described. No slot 24 need be provided in the channel 11 (Fig. 1) if constructed in that manner.

The invention is particularly useful in connection with the treatment of aluminum, inasmuch as this metal, normally when liquid, is extremely viscous and possesses very low buoyancy because of its low specific gravity, and is characterized by an extreme tendency to occlude the oxide within its mass because of its viscosity and low buoyancy. Further, the melting point of aluminum is low, so that comparatively low temperatures may be utilized for its treatment. The viscosity of aluminum when undergoing treatment, is apparently destroyed.

It is understood that the invention is applicable to metals and alloys in general. When treating alloys, not only are they freed from impurities, but there is also obtained a high degree of homogeneity with reference to admixture of their component elements.

The treatment of metal in accordance with the invention need not be carried out in a mold, but may be carried out in any suitable container; and the metal may thereafter be cast into a mold by any appropriate method. The invention may, of course, be utilized for purification of normally liquid conducting material.

In the claims, wherever the word "metal" appears, it should be construed as covering both a metal and an alloy. The terms "undirectional" and "undirectionally" should be interpreted as meaning that the electromagnetic forces produced in accordance with the invention are unidirectional and act unidirectionally with respect to the path of the current, i. e., that unidirectional and unidirectionally acting forces are present in each consecutive plane transverse to said path. Further, wherever the character of the current is not specifically stated, the term "unidirectional" should be broadly interpreted as meaning that undirectional steady forces are produced when using direct current and unidirectional effective forces when using alternating current. A similar interpretation should be made of the qualifying term "downward." The current qualifying term "alternating" should be construed as covering any current which varies periodically with time. The term "eliminated" employed in connection with the forces of varied directions normally produced by passage of current should be interpreted as meaning that such forces are either neutralized or converted into unidirectional forces.

What is claimed is:

1. The method of treating a conducting material, which comprises passing an electric current through the material in the liquid state and simultaneously electromagnetically inducing in cooperation with said current unidirectional or substantially unidirectional forces within the material, the forces of varied directions normally produced by passage of current alone being eliminated or materially eliminated.

2. The method of treating a conducting material, which comprises passing an alternating current through the material in the liquid state and simultaneously electromagnetically inducing within the material in cooperation with said current cyclic forces the effective values of which act unidirectionally or substantially unidirectionally, the cyclic forces of varied directions normally produced by passage of alternating current alone being eliminated or substantially eliminated.

3. The method of treating a liquid conducting material, which comprises passing an electric current through the material and simultaneously electromagnetically inducing in cooperation with said current unidirectional vertical or substantially unidirectional vertical forces within the material, the forces of varied directions normally produced by passage of current alone being eliminated or substantially eliminated.

4. The method of treating a liquid conducting material, which comprises passing an alternating current through the material and simultaneously electromagnetically inducing within the material in cooperation with said current cyclic forces the effective values of which act unidirectionally vertically or substantially unidirectionally vertically, the cyclic forces of varied directions normally produced by passage of alternating current alone being eliminated or materially eliminated.

5. The method of treating a metal, which comprises passing an electric current through the metal in a molten state and simultaneously electromagnetically inducing in cooperation with said current downward internal forces within the metal, the forces of varied directions normally produced by passage of current alone being eliminated or materially eliminated.

6. The method of treating a metal, which comprises passing an alternating current through the metal in a molten state and simultaneously electromagnetically inducing within the metal in cooperation with said current cyclic forces the effective values of which act downward, the cyclic forces of varied directions normally produced by passage of current alone being eliminated or substantially eliminated.

7. The method of treating a conducting material, which comprises passing an electric current through the material in the liquid state and simultaneously subjecting the current-carrying material to the action of a magnetic field uniformly directed therethrough transversely to the path of said current, to electromagnetically induce unidirectional or substantially unidirectional forces within the material, the forces of varied directions normally produced by passage of current alone being eliminated or substantially eliminated.

8. The method of treating a conducting material, which comprises passing an electric current through the material in a liquid state and simultaneously subjecting the field produced by said current to the action of a magnetic body or magnetic bodies disposed in the vicinity of the material and partially enclosing the material, to electromagnetically induce unidirectional or substantially unidirectional internal forces within the material, the forces of varied directions normally produced by passage of current alone being eliminated or substantially eliminated.

9. The method of treating a metal, which comprises passing an alternating current through the metal in a molten state and simultaneously subjecting the field produced by said current to the action of a magnetic body or magnetic bodies disposed in the vicinity of the metal and partially enclosing the metal, to convert the internal cyclic forces normally produced by passage of alternating current alone into stronger forces the effective values of which act unidirectionally or substantially unidirectionally.

10. The method of treating a conducting material, which comprises passing an alternating current through the material in the liquid state and simultaneously subjecting the field produced by said current to the action of a magnetic body or magnetic bodies disposed in the vicinity of the material and partially enclosing the material, to convert the internal cyclic forces normally produced in the material by passage of alternating current alone into stronger forces the effective values of which act downward.

11. In casting metal, the method of treating the metal comprising passing an electric current through the metal while in a liquid condition in its mold and simultaneously electromagnetically inducing in cooperation with said current undirectional or substantially unidirectional forces within the metal, the forces of varied directions normally produced by passage of current alone being eliminated or substantially eliminated.

12. The method of treating metal comprising passing an electric current through the metal and simultaneously electromagnetically inducing in cooperation with said current unidirectional or substantially unidirectional internal forces within the metal, while the metal undergoes solidification, the forces of varied directions normally produced by passage of current alone being eliminated or substantially eliminated.

13. The method of treating metal comprising passing an electric current through the metal and simultaneously electromagnetically inducing in cooperation with said current unidirectional or substantially unidirectional forces within the metal, while the metal undergoes solidification, said current being controlled to cause slow cooling of the metal, the forces of varied directions normally produced by passage of current alone being eliminated or substantially eliminated.

14. The method of treating metal comprising passing an electric current through the metal and simultaneously electromagnetically inducing in cooperation with said current unidirectional or substantially unidirectional internal forces within the metal, while the metal is cooling into solidification and thereafter while the metal is cooling beyond the state of solidification, the forces of varied directions normally produced by passage of current alone being eliminated or substantially eliminated.

15. In casting metal, the method of treating the metal comprising passing an electric current through the metal while in a liquid condition in its mold and simultaneously electromagnetically inducing in cooperation with said current downward internal forces within the metal, the forces of varied directions normally produced by passage of current alone being eliminated or materially eliminated.

16. In casting metal, the method of treating the metal comprising passing an electric current through the metal in its mold and simultaneously electromagnetically inducing in cooperation with said current downward internal forces within the metal, while fluid metal is filling the mold by being cast therein, the forces of varied directions normally produced by passage of current alone being eliminated or materially eliminated.

17. In casting metal, the method of treating the metal comprising passing an electric current through the metal in its mold and simultaneously electromagnetically inducing in cooperation with said current downward internal forces within the metal, while fluid metal is filling the mold by being cast therein and thereafter for a period of time while the cast metal is still fluid, the forces of varied directions normally produced by passage of current alone being eliminated or materially eliminated.

18. In casting metal, the method of treating the metal comprising passing an electric current through the metal in its mold and simultaneously electromagnetically inducing in cooperation with said current downward internal forces within the metal, while the metal is undergoing solidification, the forces of varied directions normally produced by passage of current alone being eliminated or materially eliminated.

19. In casting metal, the method of treating the metal comprising passing an electric current through the metal in its mold and simultaneously electro-magnetically inducing in cooperation with said current downward internal forces within the metal, while the metal is fluid and thereafter while the metal undergoes solidification, the forces of varied directions normally produced by passage of current alone being eliminated or materially eliminated.

20. In casting metal, the method of treating the metal comprising passing an electric current through the metal in its mold and simultaneously electromagnetically inducing in cooperation with said current downward internal forces within the metal, while fluid metal is filling the mold by being cast therein and thereafter while the cast metal is undergoing solidification, the forces of varied directions normally produced by passage of current alone being eliminated or materially eliminated.

21. In casting metal, the method of treating the metal comprising passing an electric current through the metal in its mold and simultaneously electromagnetically inducing in cooperation with said current downward internal forces within the metal, while fluid metal is filling the mold by being cast therein and thereafter while the cast metal is undergoing solidification and thereafter while the cast metal is cooling beyond the stage of solidification, the forces of varied directions normally produced by passage of current alone being eliminated or substantially eliminated.

22. In casting metal, the method of treating the metal comprising passing an alternating current through the metal while in a liquid condition in its mold and simultaneously electromagnetically inducing within the metal in cooperation with said current internal cyclic forces of unidirectional or substantially undirectional effective action, the cyclic forces of varied directions normally produced by passage of alternating current alone being eliminated or substantially eliminated.

23. The method of treating metal comprising passing an alternating current through the metal and simultaneously electromagnetically inducing within the metal in cooperation with said current cyclic forces of unidirectional or substantially unidirectional effective action, while the metal undergoes solidification, the cyclic forces of varied directions normally produced by passages of alternating current alone being eliminated or substantially eliminated.

24. In casting metal, the method of treating the metal comprising passing an alternating current through the metal while in a liquid condition in its mold and simultaneously electromagnetically inducing within the metal in cooperation with said current internal cyclic forces of downward effective action, the cyclic forces of varied directions normally produced by passage of alternating current alone being eliminated or substantially eliminated.

25. In casting metal, the method of treating the metal comprising passing an alternating current through the metal in its mold and simultaneously electromagnetically inducing within the metal in cooperation with said current internal cyclic forces of downward effective action, while fluid metal is filling the mold by being cast therein, the cyclic forces of varied directions normally produced by passage of alternating current alone being eliminated or substantially eliminated.

26. The method of treating metal comprising passing an alternating current through the metal and simultaneously electromagnetically inducing within the metal in cooperation with said current cyclic forces of downward effective action, while the metal undergoes solidification, the cyclic forces of varied directions normally produced by passage of alternating current alone being eliminated or substantially eliminated.

27. The method of treating metal comprising passing an alternating current through the metal and simultaneously subjecting the field produced by said current to the action of a magnetic body or magnetic bodies disposed in the vicinity of the metal and partially enclosing the metal, while the metal undergoes solidification, the cyclic forces normally produced by passage of alternating current being converted into stronger forces of downward effective action.

28. The method of treating metal comprising passing an alternating current through the metal and simultaneously electromagnetically inducing within the metal in cooperation with said current internal cyclic forces of downward effective action, while the metal is cooling into solidification and thereafter while the metal is cooling beyond the stage of solidification, the cyclic forces of varied directions normally produced by passage of alternating current alone being eliminated or substantially eliminated.

29. The method of producing a metal casting, which comprises passing an electric current through the molten metal to be cast and simultaneously electromagnetically inducing in cooperation with said current downward internal forces within the molten metal to be cast causing it to flow into a mold; and passing an electric current through the metal in the mold and simultaneously electromagnetically inducing in cooperation with said second current downward internal forces within the metal in the mold, while the metal in the mold is still fluid; the forces of varied directions normally produced by passage of current alone being eliminated or materially eliminated from both the casting metal and the metal in the mold.

30. The method of producing a metal casting, which comprises passing an electric current through the molten metal to be cast and simultaneously electromagnetically inducing in cooperation with said current downward internal forces within the molten metal to be cast causing it to flow into a mold; and passing an electric current through the metal in the mold and simultaneously electromagnetically inducing in cooperation with said second current downward internal forces within the metal in the mold, while fluid metal is filling the mold; the forces of varied directions normally produced by passage of current alone being eliminated or materially eliminated from both the casting metal and the metal in the mold.

31. The method of producing a metal casting, which comprises passing an electric current through the molten metal to be cast and simultaneously electromagnetically inducing in cooperation with said current downward internal forces within the molten metal to be cast causing it to flow into a mold; and passing an electric current through the metal in the mold and simultaneously electromagnetically inducing in cooperation with said second current downward internal forces within the metal in the mold, while fluid metal is filling the mold and thereafter while the cast metal is undergoing solidification; the forces of varied directions normally produced by passage of current alone being eliminated or materially eliminated from both the casting metal and the metal in the mold.

32. The method of producing a metal casting, which comprises passing an electric current through the molten metal to be cast and simultaneously electromagnetically inducing in cooperation with said current downward internal forces within the molten metal to be cast causing it to flow into a mold; and passing an electric current through the metal in the mold and simultaneously electromagnetically inducing in cooperation with said second current downward internal forces within the metal in the mold, while fluid metal is filling the mold and thereafter while the cast metal is undergoing solidification and thereafter while the cast metal is cooling beyond the stage of solidification; the forces of varied directions normally produced by passage of current alone being eliminated or substantially eliminated from both the casting metal and the metal in the mold.

WALTER W. HOKE.

CERTIFICATE OF CORRECTION.

Reissue No. 20,349. May 4, 1937.

WALTER W. HOKE.

It is hereby certified that error appears in the printed specification of the above numbered patent requiring correction as follows: Page 1, second column, line 47, for the word "of" read or; page 3, first column, line 30, for "electromagneitc" read electromagnetic; and second column, line 51, for electro-magnet" read electromagnet; page 10, first column, line 67, after the syllable "ization" strike out the comma; and second column, line 57, for "portions" read portion; page 11, first column, line 25, for "curves" read curve; page 15, first column, line 22, claim 19, for "electro-magnetically" read electromagnetically; line 70, claim 23, for "passages" read passage; and that the said Letters Patent should be read with these corrections therein that the same may conform to the record of the case in the Patent Office.

Signed and sealed this 27th day of July, A. D. 1937.

(Seal)

Henry Van Arsdale
Acting Commissioner of Patents.